Aug. 12, 1969   R. S. HUGHES ETAL   3,461,392
PULSE REPETITION FREQUENCY TO DIRECT CURRENT CONVERTER
Filed Sept. 8, 1966   2 Sheets-Sheet 1

INVENTORS.
RICHARD S. HUGHES
CHARLES E. MCCALL
BY

ROY MILLER
ATTORNEY

INVENTORS.
RICHARD S. HUGHES
CHARLES E. MCCALL
BY

ROY MILLER
ATTORNEY

United States Patent Office 3,461,392
Patented Aug. 12, 1969

3,461,392
PULSE REPETITION FREQUENCY TO DIRECT CURRENT CONVERTER
Richard Smith Hughes, Code 4022 U.S.N.O.T.S., and Charles E. McCall, Code 4025 U.S.N.O.T.S., both of China Lake, Calif.
Filed Sept. 8, 1966, Ser. No. 578,431
Int. Cl. H03k 9/06
U.S. Cl. 329—104    2 Claims

ABSTRACT OF THE DISCLOSURE

A device for converting a pulse repetition frequency signal to a direct current voltage. Incoming pulses trigger a flip-flop, the output of which drives a variable period one-shot. The outputs of the flip-flop and the variable period one-shot are summed, and the difference signal used to drive an integrator, the output of which is fed back to control the time period of the one-shot to make the time period of the one-shot equal to the time period of the flip-flop. The integrator output is a direct current voltage which varies as a function of the pulse repetition frequency.

---

The invention described herein may be manufactured and used by or for the Government of the United States of America for governmental purposes without the payment of any royalties thereon or therefor.

Various types of converters are disclosed in the prior art to provide a direct current output voltage which is proportional to the frequency of an input signal. Prior art converters have disadvantages such as temperature sensitivity and deviations from linearity, as well as the use of complex circuitry of relatively low efficiency or accuracy.

Accordingly, it is a primary object of this invention to provide a circuit which will accurately and efficiently convert an incoming pulse repetition frequency into a direct current voltage that is a linear function of the period of the pulse repetition frequency.

Additional objects of the invention will become apparent from the following description, which is given primarily for purposes of illustration, and not limitation.

Stated in general terms, the objects of the invention are attained by providing a converter circuit wherein an incoming pulse repetition frequency triggers, or operates a flip-flop circuit, the output of which, in turn, triggers, operates or drives, a variable period one-shot circuit. The outputs of the flip-flop and the one-shot circuits are subtracted, and the difference, or error signal, is used to drive an integrator. The output of the integrator is used to control the one-shot circuit and makes the time period of the one-shot equal to the time period of the flip-flop. The output of the integrator is a direct current control voltage which varies as the pulse repetition rate of the incoming pulses.

A more detailed description of a specific embodiment of the invention is given below with reference to the accompanying drawings, wherein.

Figure 1:
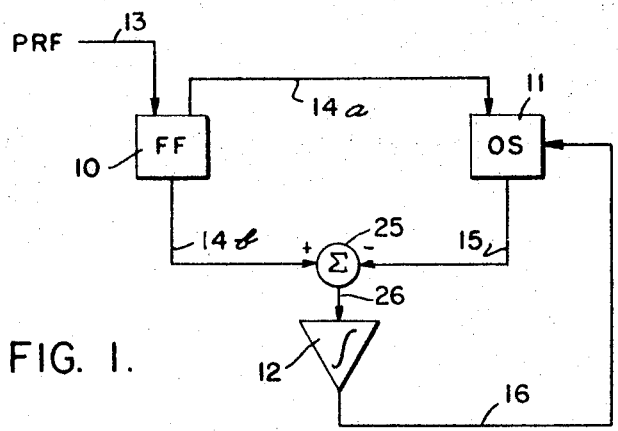
FIG. 1 is a schematic block diagram showing the basic elements of the pulse repetition frequency to direct current converter of the invention.
Figure 2:
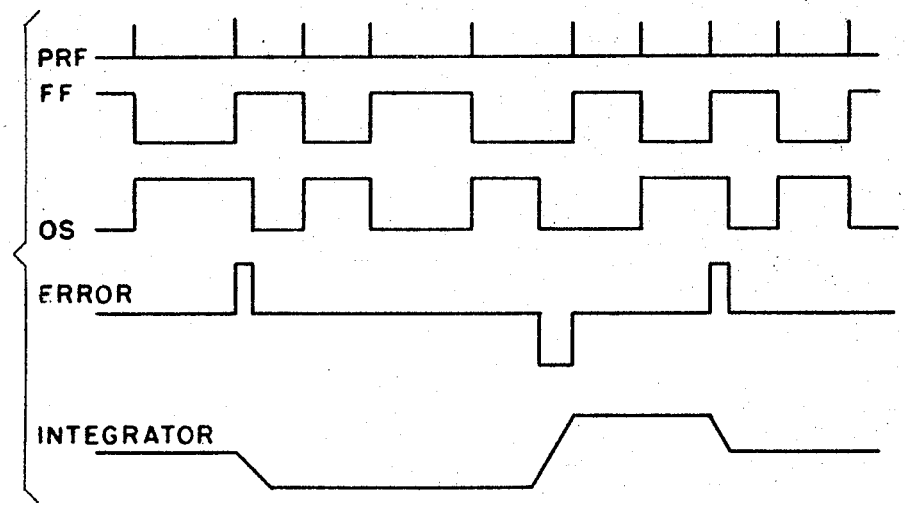
FIG. 2 is a schematic time-voltage diagram graphically showing a train of converter input pulses, corresponding output pulses of the flip-flop and one-shot circuits, respectively, the error signal and the corresponding output of the integrator circuit.

As shown in FIG. 1, the basic elements of the voltage pulse repetition frequency to direct current voltage converter include a flip-flop circuit 10, a variable period one-shot circuit 11, a summing circuit 25 and an integrator circuit 12. The incoming voltage pulse repetition frequency, PRF, signal train shown in FIG. 2 is introduced into flip-flop 10, as indicated at 13. The PRF signal train triggers flip-flop 10, which produces an output signal FF, as indicated at 14a, and 14b, and shown in waveform in FIG. 2.

The output signal FF is in turn introduced, as indicated at 14a, into variable period one-shot 11 to trigger the one-shot circuit. The output of one-shot 11, indicated at 15, is also shown as OS in FIG. 2. The outputs of flip-flop 10 and one-shot 11 are subtracted by summing circuit 25 to produce error signal 26, shown as ERROR in FIG. 2.

The resultant error signal, 26, is integrated in integrator 12, as indicated in FIG. 1, to produce an integrator output signal 16, shown in waveform as INTEGRATOR in FIG. 2. The integrator output signal is, in turn, fed into variable period one-shot 11 to change the period of one-shot 11 so that it is the same as the period of flip-flop 10. It will be clearly seen therefore, from FIGS. 1 and 2, that error signal 26 drives the integrator 12 to make the period of the one-shot 11 equal to the last period of flip-flop 10.

Upon closely observing FIG. 1, it will be observed that if the incoming pulse repetition frequency signal 13 stops, and flip-flop 10 is in the wrong state, integrator 12 will charge to a higher voltage. For this reason, the basic converter circuit of FIG. 1 was modified, as shown in FIG. 3, by the addition of a second one-shot 20, an AND gate 22 and an OR gate 21, with connections, as shown.

Figure 3:
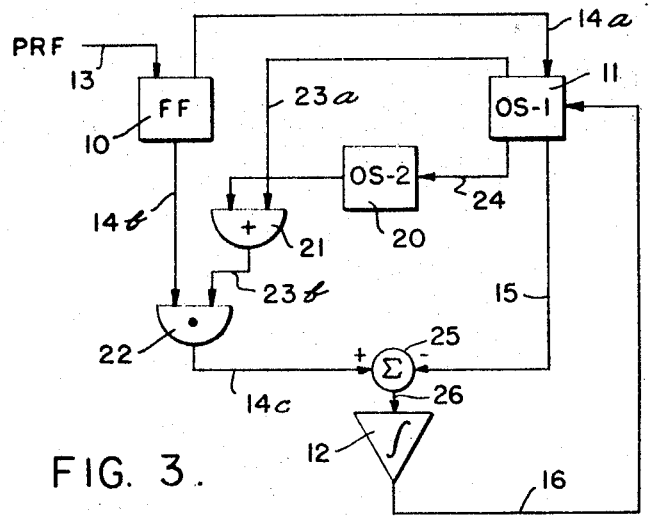
FIG. 3 is a view similar to that of FIG. 1 showing a modification of the converter of FIG. 1.

In the modified circuit of FIG. 3, the input pulse repetition frequency signal 13 triggers flip-flop 10, which, in turn triggers the variable trigger one-shot 11, also indicated OS–1, as described above with reference to FIG. 1. One-shot 11 enables AND gate 22 with flip-flop 10, through connections 23a and 23b and OR gate 21. When one-shot 11 turns off, it triggers one-shot 20 also indicated OS–2, through connection 24. One-shot 20 will keep AND gate 22 enabled for the period of the one-shot.

Figure 4:
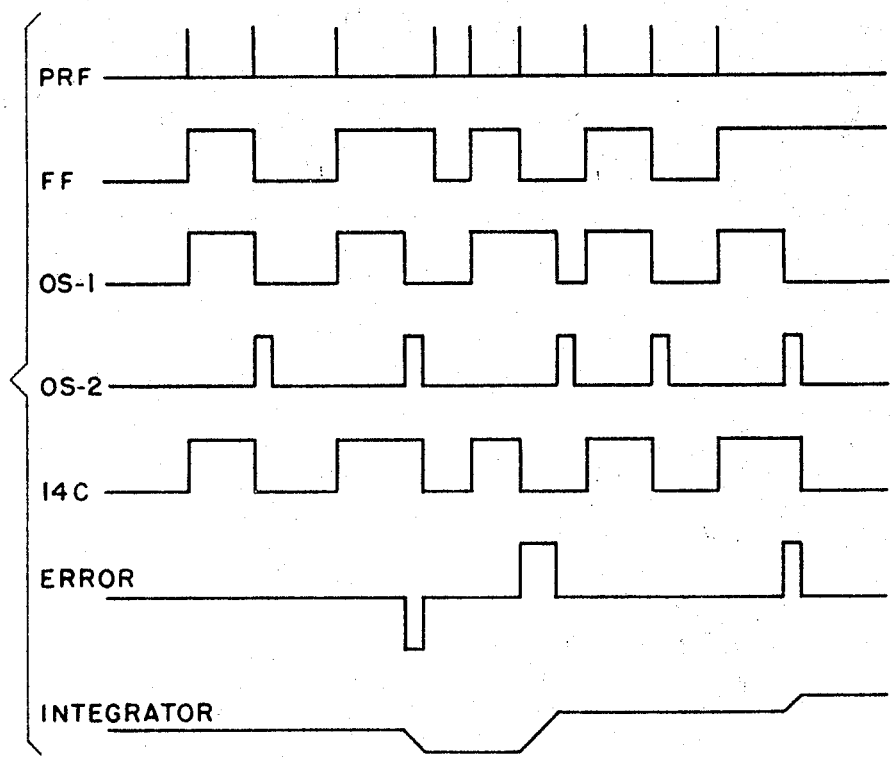
FIG. 4 is a view similar to that of FIG. 2 but relating to the modified converter of FIG. 3.

Thus, the charge caused by flip-flop 10 can be no longer than the sum of the periods of one-shots 11 and 20. The period for one-shot 20 should not be longer than the minimum period expected. For example, for a maximum frequency of about 3,000 cycles per second the period should not be longer than about 333 microseconds. The waveforms of the various signals corresponding to the modified circuit of FIG. 3 are shown in FIG. 4. It will be seen that in the last period the flip-flop 10 is in the high voltage state and the integrator 12 only charges for a time corresponding to the period of the one-shot 20. It should be noted that the only situation in which one-shot 20 has any effect is in the event that the period of flip-flop 10 exceeds the sum of the periods of one-shots 11 and 20.

The one-shot 11 circuit is one which will give a voltage output that is a linear function of the period of the input pulses or a hyperbolic function thereof. One-shot 20 is the conventional one-shot circuit.

Obviously many modifications and variations of the present invention are possible in the light of the above teachings. It is therefore to be understood that the invention may be practiced otherwise than as specifically described.

What is claimed is:
1. A pulse repetition frequency to direct current voltage converter which comprises:
   a flip-flop circuit for receiving a train of incoming pulses which may have various pulse repetition frequencies;
   a variable period one-shot circuit driven by the flip-flop;

a summing circuit for determining the difference between the output of the flip-flop and the output of the variable period one-shot; and an integrator circuit driven by the summing circuit, the output of which is used to control the one-shot circuit to make the time period of the one-shot equal to the time period of the flip-flop;

so that the output of the integrator is a direct current voltage which is directly proportional to the pulse repetition rate of the incoming pulses received by the flip-flop circuit.

2. A pulse repetition frequency to direct current voltage converter as set forth in claim 1 and further including:

an AND gate circuit for gating the pulses passing from the flip-flop circuit to the summing circuit;

a second one-shot circuit triggered by the first-mentioned one-shot circuit when the first-mentioned one-shot turns off and an OR gate circuit the output of which enables and disables the AND gate, and the input to which are coupled with the output from the first one-shot and the output from the second one-shot;

so that the AND gate is enabled during the period of the first one-shot, or during the period of the second one-shot.

References Cited
UNITED STATES PATENTS 3,205,438    9/1965    Buck _____ 328—133 X
3,249,878    5/1966    Magnin _____ 328—63

ALFRED L. BRODY, Primary Examiner

U.S. Cl. X.R.

307—233, 271; 328—63, 110, 133, 140; 329—50, 122, 126